United States Patent
Kwok et al.

(10) Patent No.: US 8,055,053 B2
(45) Date of Patent: Nov. 8, 2011

(54) PHYSIMETRIC PROPERTY IDENTIFICATION OF PHYSICAL OBJECT FOR PROCESS CONTROL

(75) Inventors: Siu Keung Kwok, Hung Hom (CN); Chi Fai Cheung, Hung Hom (CN); Hing Choi Tsang, Hung Hom (CN); Wing Bun Lee, Hung Hom (CN); Burly K. Tan, Hung Hom (CN); Pui Him Ng, Hung Hom (CN)

(73) Assignee: The Hong Kong Polytechnic University, Hung Hom, Kowloon (HK)

( * ) Notice: Subject to any disclaimer, the term of this patent is extended or adjusted under 35 U.S.C. 154(b) by 893 days.

(21) Appl. No.: 11/638,482

(22) Filed: Dec. 14, 2006

(65) Prior Publication Data

US 2008/0147344 A1  Jun. 19, 2008

(51) Int. Cl.
*G06K 9/00* (2006.01)
*G06K 15/00* (2006.01)
*G01D 1/00* (2006.01)
*G01K 11/30* (2006.01)
*G01B 7/00* (2006.01)
*G01B 15/00* (2006.01)
*G01B 5/18* (2006.01)
*G01B 7/26* (2006.01)
*G01B 11/22* (2006.01)
*G01B 13/14* (2006.01)
*G01B 21/18* (2006.01)
*G06F 17/00* (2006.01)

(52) U.S. Cl. ........ 382/141; 382/143; 382/100; 702/129; 702/134; 702/155; 702/166; 702/170; 702/173; 235/375; 235/378

(58) Field of Classification Search ........................ None
See application file for complete search history.

(56) References Cited

U.S. PATENT DOCUMENTS

| | | | |
|---|---|---|---|
| 6,891,474 | B1 | 5/2005 | Fletcher |
| 6,917,291 | B2 | 7/2005 | Allen |
| 7,118,034 | B2 | 10/2006 | Baldassari et al. |
| 7,472,031 | B2 * | 12/2008 | Georgitsis ............ 702/101 |
| 7,677,438 | B2 * | 3/2010 | DeJean et al. ............ 235/375 |

FOREIGN PATENT DOCUMENTS

| | | | |
|---|---|---|---|
| DE | 10335187 | A1 * | 3/2005 |
| EP | 813176 | A1 * | 12/1997 |

(Continued)

OTHER PUBLICATIONS

70% Citizens Cannot Identify Fake Products—Hong Kong Daily, A7 Sep. 17, 2006.

(Continued)

*Primary Examiner* — Tom Y Lu
*Assistant Examiner* — Thomas Conway

(57) ABSTRACT

The present invention relates to a method of automated process control operation wherein a physical object is directed into a read zone, information stored on an ID Container attached to the physical object is retrieved, physimetric property of the physical object is captured, the retrieved information is processed to provide recorded physimetric property specific to the physical object, the recorded physimetric property and captured physimetric property are passed to an analysis algorithm for comparison, and the results of the comparison are delivered to a controlling device. The results of the comparison will determine whether the physical property will continue to pass through the read zone or require to be rotated by the operator.

17 Claims, 3 Drawing Sheets

FOREIGN PATENT DOCUMENTS

WO    WO 2005/111554 A2 * 11/2005

OTHER PUBLICATIONS

Over 50% of Hong Kong People Do Not Know How to Identify Fake Porducts—Orisun Daily, A14 Sep. 17, 2006.
The Technique of RFID Is More Reliable Than Laser Labels—Sing Pao Daily, A05 Sep. 17, 2006.
70% Consumers Have Bought Fake Products Before—Sing Tao Daily, A14 Sep. 17, 2006.
The RFID Technology Invented by the POLYU Can Locate Fake Goods—Applédaily, A12, Sep. 17, 2006.
70% Consumers Cannot Identify Fake Products—Oriental Daily, A21 Sep. 17, 2006.
POLYU Invented RFID to Identify Fake Porducts—Hong Kong Commercial Daily, A3 Sep. 17, 2006.
RFID Chips Can Reveal Fake Products—Wen Wei Po, A13 Sep. 17, 2006.
Over 50% of Hong Kong People Do Not Resist Buying Fake Products Research Indicates That Citizen Have Weak Knowledge of Intellectual Property Protection—Takung Pao, A5 Sep. 17, 2006.
Smart Anti-counterfeit Label is Better Than Laser Label—Ming Pao, A19 Sep. 17, 2006.

* cited by examiner

PHYSIMETRIC PROPERTY IDENTIFICATION OF PHYSICAL OBJECT FOR PROCESS CONTROL

BACKGROUND

In current process control operations for products, including quality control, content, or quantity checking, a highly accurate reading of an ID tag is required for determining the authenticity or identity of a target product. Presently, however, readings within the operation are not fully accurate as some goods are not detected during the reading. The lack of complete accuracy may result from improper attachment of ID tags, wave reflection, absorption, interference, etc. As there is no automatic process to flag errors of non-detection of one or more items during the tracking process, it is common practice to stop and manipulate all items that enter a reading zone to ensure that all the items are accurately read. The requirement to stop and manipulate all items increases the length of time in which an item can be read, and is especially time consuming when large numbers of items must be read. Identity can further by compromised when ID tags can be detached from one product and attached to another, allowing from fraud representation of products.

Physimetric property identification is a method of verifying and recognizing the identity or authenticity of a physical object based on that object's physical properties. The use of physimetric property identification as applied to process control operations would allow an identification device to become part of an object as opposed to merely attached to it. This would ensure that fraudulent removal of an ID tag from one product and attachment to another would not be successful. However, in current process control operations, because every object must be stopped and manipulated, until now physimetric property identification could not be utilized because it is an automated identification process.

It is an object of the present system to overcome these and other disadvantages in the prior art.

SPECIFICATION

The present invention proposes of a method of the reading of physical objects during a process control operation.

The present process teaches a method by which physical objects may be identified, authenticated, and/or verified in a process control operation through physimetric property identification by allowing the physical object to enter a reading zone, allowing information on an ID tag to be read, allowing the physical object to be analyzed for its physical properties, comparing information from the ID tag and the object's physical properties, and determining whether the object requires further manipulation and handling by the process control operator. The present process also allows for automation of the process control operation, thus decreasing the amount of time required to authenticate a product.

The following are descriptions of illustrative embodiments that when taken in conjunction with the following drawings will demonstrate the above noted features and advantages, as well as further ones. In the following description, for purposes of explanation rather than limitation, specific details are set forth such as the particular architecture, interfaces, techniques, etc., for illustration. However, it will be apparent to those of ordinary skill in the art that other embodiments that depart from these specific details would still be understood to be within the scope of the appended claims. Moreover, for the purpose of clarity, detailed descriptions of well-known devices, circuits, and methods are omitted so as not to obscure the description of the present invention.

It should be expressly understood that the drawings are included for illustrative purposes and do not represent the scope of the present system.

As used herein, "physical object" shall refer to bulk or single products or objects, such products or objects being bundled individually or in batches, such products or objects totally or partially matching one another in terms of physimetric property, such products or objects being solid, liquid, gaseous, or combinations thereof;

"Physimetric property" shall refer to a physical objects' physical properties, including but not limited to dimensions, weight, mass, color, shape, size, pattern, substrate material, light reflective/refractive index, or design;

"Read zone" shall refer to the area covered by a electromagnetic field generated by an interrogator or reader;

"Interrogator" shall refer to any transceiver capable of transmitting to and receiving signals from a transponder such as a RFID tag, Smartcard, or barcode;

"Controlling device" shall refer to any device suitable for operating an interrogator within a read zone, for example, a computer. The controlling device may be a computer including a laptop or table top computer, handheld device such as a pda, or operating panel, and generally contains a processor, interface device, power source, memory, and input/output means such as wires or wireless technology;

"Identified" shall refer to the process of recognizing or establishing the identity of physical objects;

"Authentication" shall refer to the genuineness of an object or claim. Characteristics of the physical object to be authenticated shall include purity, quality, quantity, freshness, source of the physical object, and composition of the physical object;

"Verification" shall refer to the process of testing the physical object;

"Processor" shall refer to any type of processor/controller such as those described in U.S. 2003/0057887. The processor is capable of providing output or control signals in response to input signals from a user interface e.g., displayed on the display 150 which may be a touch sensitive screen, executing instruction stored in the memory 140, which in turn may be any type of memory, RAM, ROM, removable memory, CD-ROM, and the like, also as described in U.S. 2003/0057887;

"Memory" shall refer to type of memory, RAM, ROM, removable memory, CD-ROM, and the like, as described in U.S. 2003/0057887.

Figure 1:
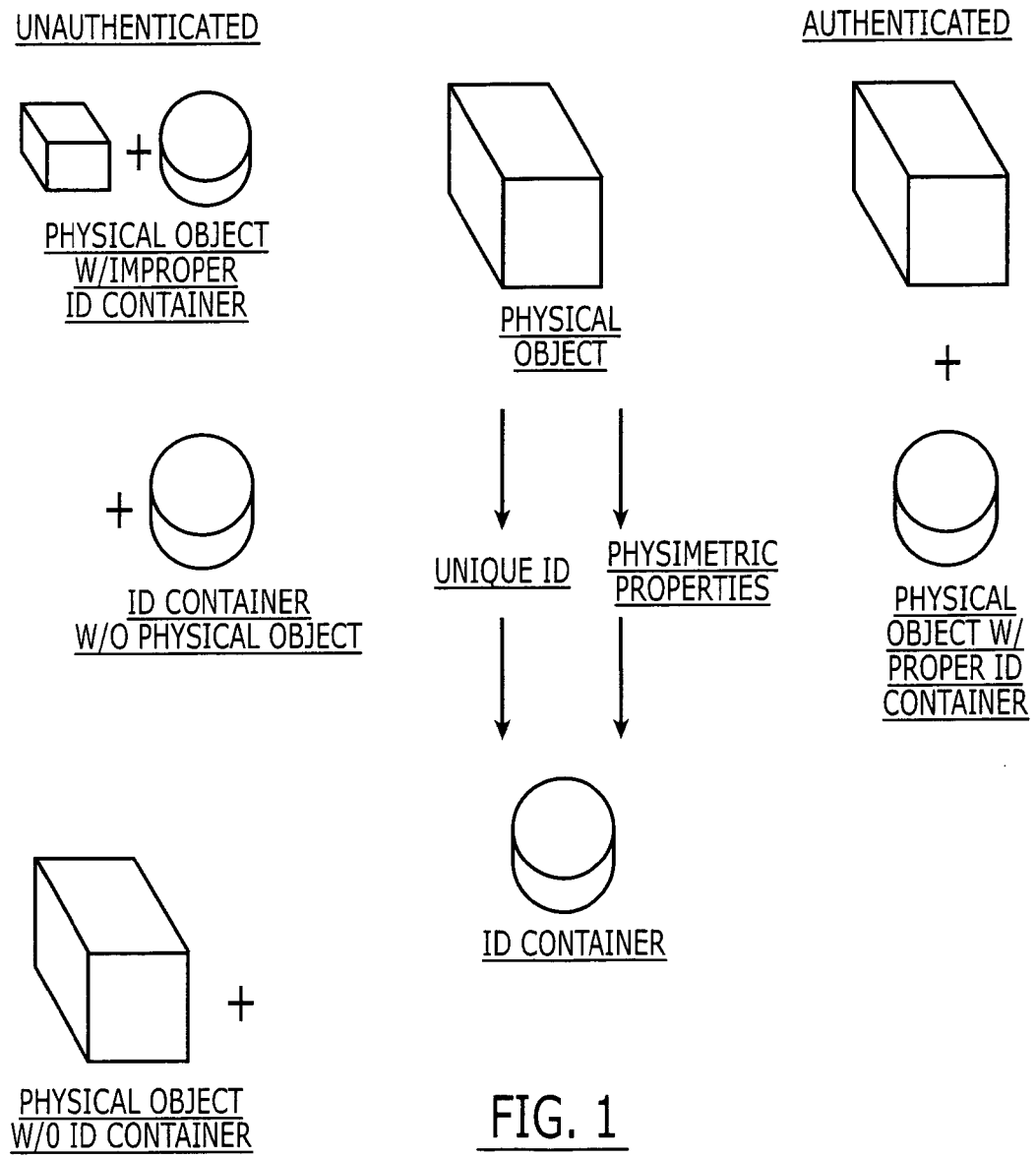
FIG. 1 shows the concept of physimetric property identification as applied to ID Containers.
Figure 2:
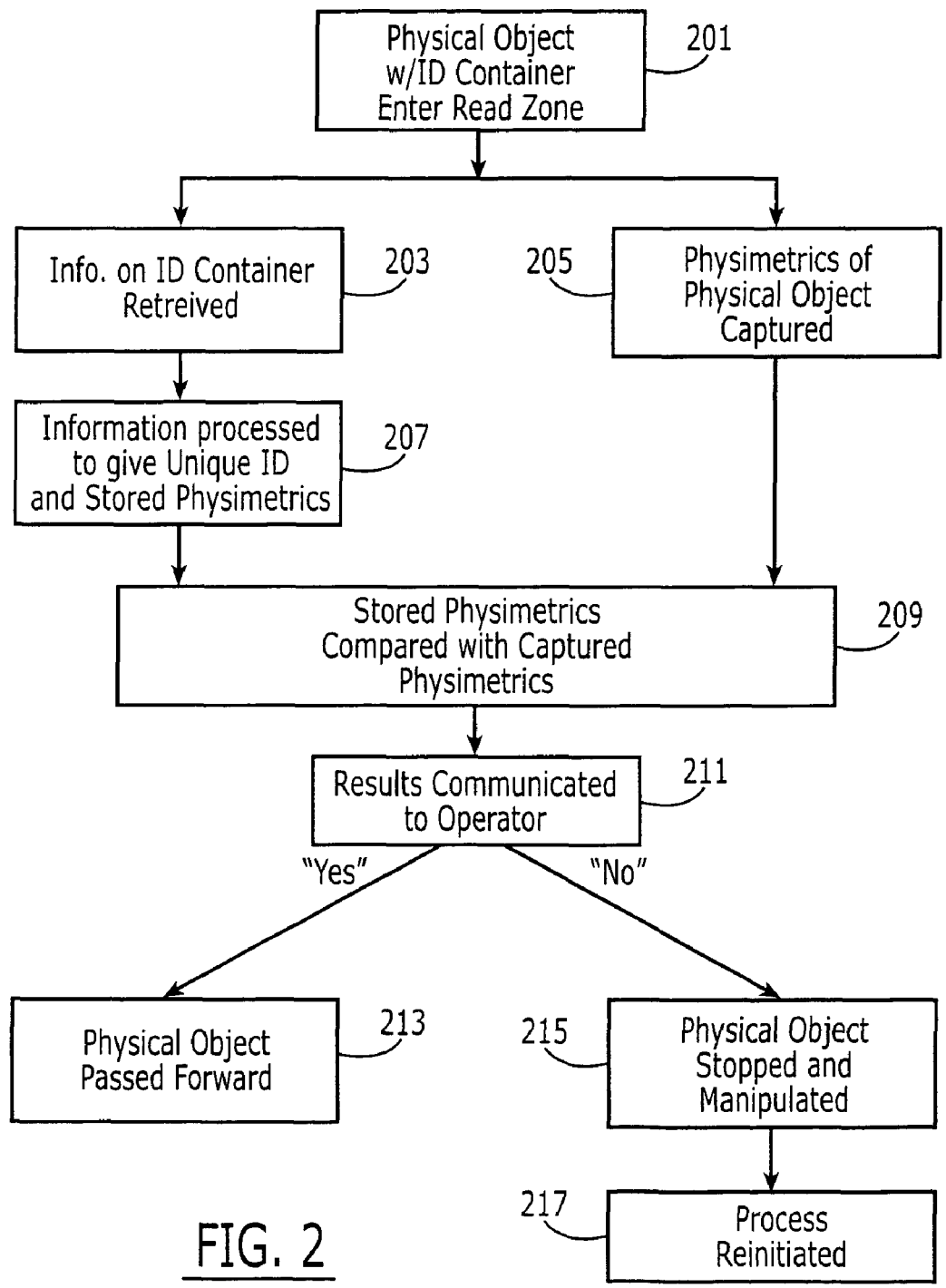
FIG. 2 shows the instant process by which a physical object is verified through an automated method.
Figure 3:
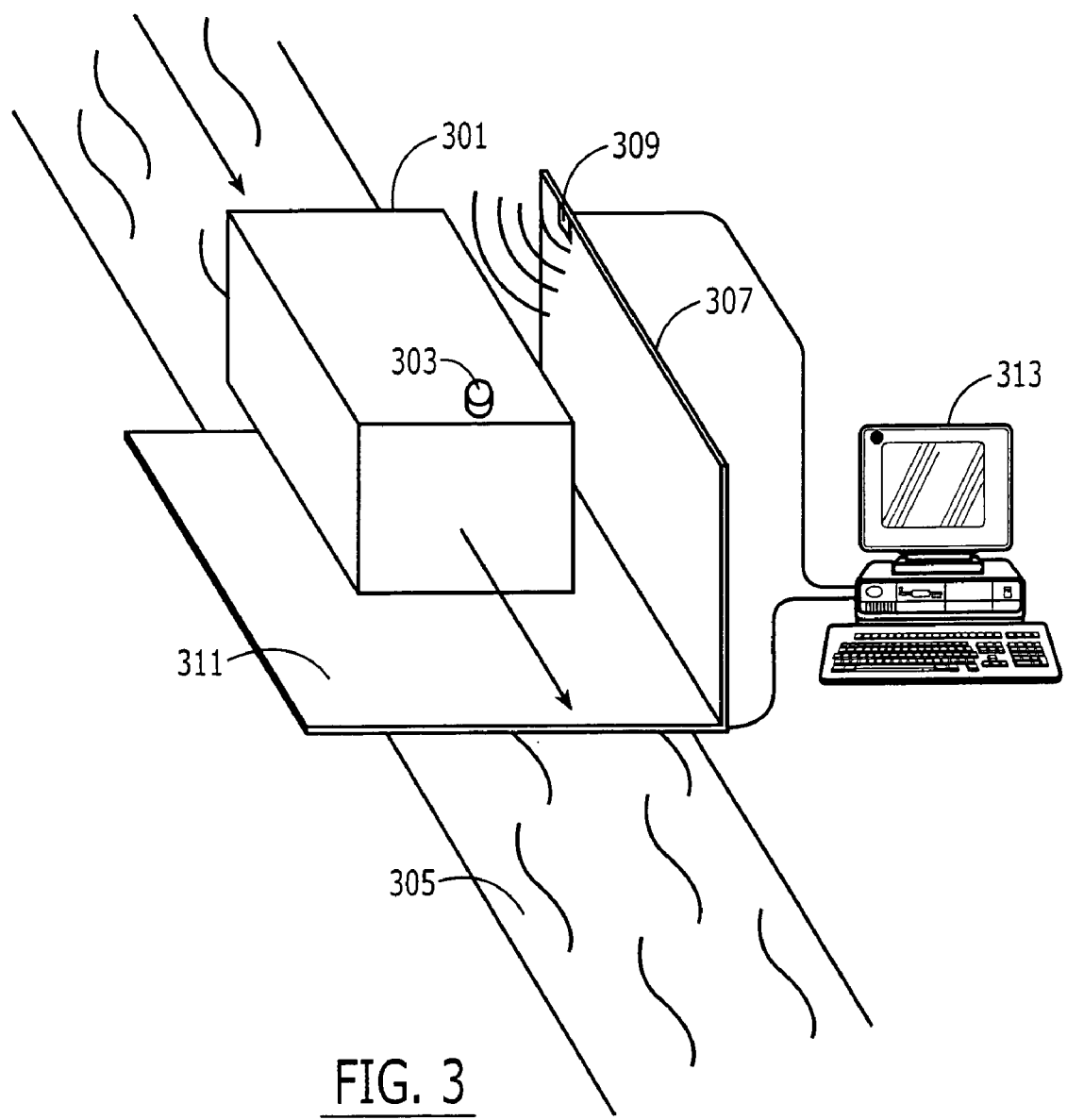
FIG. 3 is an example of the instant process.

FIG. 1-3 show embodiments as used in the present invention.

FIG. 1 shows the concept of physimetric property identification as applied to physical objects. Unauthenticated physical objects are those where the physical object is matched with an improper ID Container, where the ID Container is not attached to a physical object, or where a physical object does not have an ID Container attached to it. Following the creation of a Unique ID for the physical object and coded physimetric property properties, the Unique ID and coded physimetric property properties can be inserted unto the memory of an ID Container. Authenticated physical objects are then those where the physical object has an ID Container attached to it, such ID Container possessing on its memory the Unique ID and coded physimetric property specific to that physical object.

FIG. 2 is an embodiment of the present method, wherein a physical object containing an ID container enters a read zone (201), information on the ID container is retrieved (203) while the physimetric property of the physical object is captured (205), the retrieved information is processed to provide the physical objects' Unique ID and stored physimetric property (207), and the stored physimetric property is then compared with the captured physimetric property (209).

Reading of the ID Container occurs by having the physical object enter a read zone. The physical object may enter the read zone through manual manipulation, i.e., someone picks up and places the physical object within the read zone, or via an automated method, such as conveyor belt. The read zone includes a detecting device, including one or more interrogators, for example RFID interrogators, barcode readers, scanners, lasers, etc. The detecting device may consist of interrogators that are similar, or two or more different kinds of interrogators. In general, the interrogators consist of circuitry to communicate with the ID Container, a processor to check and decode data, storage means for storing data, and one or more antennas to receive signals. In the event the ID Container is passive, i.e., lacking a power source, the interrogator may also include a power source for instituting communication with the ID Container. In the case of the ID Container being RFID-based container, the interrogator shall contain radio circuitry, processor, memory, and one or more antennas. Interrogators as set forth in U.S. Pat. No. 6,917,291, incorporated herein by reference, are suitable for use in the instant method. The detecting device is generally connected to a controlling device. The detecting device may be a handheld device, or mounted device.

The ID container may be, for example, radio-frequency ID (RFID) tags, barcodes, Smartcards, etc. Such ID Container may be active, semi-passive, or passive. In the event that it is active, the ID container will contain its own power source as commonly known in the art. The ID Containers as taught in U.S. Pat. Nos. 3,859,624, 3,878,528, 4,095,214, 4,354,099, 4,475,481, 4,549,264, and 4,739,328, are suitable for use herein. Suitable ID Container may be chip based or chipless, or combinations of both chip based and chipless technologies. The ID Container shall include a memory, and one or more antennas. Alternatively, the ID Container may also contain a power source, and silicon chip.

The memory of the ID Container shall be coded to include a Unique ID and coded physimetric property. The Unique ID can be represented by a code made of serial numbers, words, letters, combinations thereof, etc. in whatever length suitable for identifying the physical object to which the Unique ID pertains. The Unique ID may be stored on the memory in accordance with different identification technology standards, for example Electronic Product Code (EPC), Serial Shipping Container Code (SSCC), Global Location Number (GLN), International Organization for Standardization (ISO) standards for RFID, Smartcards, etc. The Unique ID associated specifically with the physical object is obtained from a database. Such database may be stored on the memory of the controlling device. In another embodiment, the Unique ID is designed or selected by the manufacturer, retailer, or wholesaler of the physical object. The Unique ID may be specific to a single, individual physical object such as a unit, a line of physical objects such as a product line, or a collection of lines of physical objects. The Unique ID shall represent the physical object, and be stored on the memory of the ID Container to be attached to the physical object.

The coded physimetric property can be represented by numbers, words, letters, combinations thereof, etc. The code physimetric can be based on one or more physical attributes of the physical object from which is is derived, a line of physical objects, or a collection of physical objects. For example, the physimetric property for a toy may be its weight, such physimetric property being represented by a number. In another example, the physimetric property for a diamond may be its refractive index, which can be determined by a light measuring device. In a still further example, the physimetric property for a collection of physical objects, which may be different in size, weight, and color, may be the similar substrate used to make the collection, thus this physimetric property can be represented by a combination of letters and numbers. The physimetric property will be determined by capturing the physical object via a capturing device. The capturing device can include, for example, scales, lasers, lights, optical measuring instruments such as spectrophotometric equipment, rulers, etc. For example, if capturing the weight of the physical object is necessary, a scale may be placed on the floor in the read zone to allow the physical object to rest thereon. If capturing the light reflective/refractive index of the physical object is necessary, a laser or light may be positioned such that it pinpoints the physical object upon its entering the read zone. One or more capturing devices may be used to capture the physimetric property. The capturing device can also include a processor for delivering instructions and receiving feedback from the physical object, a storage for storing the feedback, and a connection to the controlling device. The physimetric property shall be coded following its input into a conversion algorithm, such as hash functions, stored on the controlling device. Suitable hash functions can be secured, such as Secured Hash Algorithms, e.g., SHA-1, SHA-2, or unsecured. The physimetric property will be input and translated into letters, numbers, words, or collection thereof. The coded physimetric property shall be stored on the memory of the ID Container that will be connected to the physical object.

The Unique ID and coded physimetric property may be stored on the memory as a continuous unit, for example a complete string of letters, numbers, etc., or in a manner where the Unique ID and coded physimetric property are demarcated from one another by a hyphen, period, comma, slash, etc. The Unique ID may be placed in front of the coded physimetric property, or vice versa.

Following entering the read zone (201), the information on the memory of the ID Container is retrieved by the interrogator (203) and the physimetric property of the physical object is captured by the capturing device (205).

In one embodiment, the retrieved information from the memory of the ID Container (203) and the capturing of the physimetric property (205) occur simultaneously, i.e., the interrogator retrieves the information at the same time the capturing device captures the physimetric property. In such an embodiment, the verification of the physical object is fast and efficient. The amount of time taken to retrieve the information and capture the physimetric property may be between several milliseconds and 2 second.

In another embodiment, as the information is retrieved, the capturing of the physimetric property is performed through two or more cycles, i.e., the physimetric property is captured once, then the physimetric property is captured a second time, then the physimetric property may be captured subsequent more times. For example, the weight of the physical device is determined once, then determined a second time, then determined a third time. In this embodiment, the captured physimetric property can be determined to be accurate.

In yet another embodiment, the information on the memory of the ID Container is retrieved firstly, followed by the capturing of the physimetric property. In this embodiment, by staging retrieval and capture, the control device may devote its resources to one action at a time. The retrieval and capture may occur between several milliseconds of one another. In a still further embodiment, the physimetric property is first captured followed by the retrieval of information.

Following the capture of the physimetric property (205), the captured physimetric property is diverted to a comparison algorithm stored on the controlling device. The algorithm can be, for example, an array, table, database, mathematical equation or formula, etc.

Following the retrieval of information (203), the retrieved information is processed by the controlling device and the information is separated to provide the Unique ID and the stored physimetric property. Separation may occur by determining which part of the information is the Unique ID and which part is the stored physimetric property. The stored physimetric property may then be decoded by the processor, for example a number may be interpreted to mean its weight, or a letter may be interpreted to be a particular color. The stored physimetric property, now decoded, is directed to the comparison algorithm stored on the controlling device. The comparison algorithm should be the same one where the captured physimetric property was diverted to.

The stored physimetric property is then compared to the captured physimetric property within the comparison algorithm. Comparison can be, for example, a straight-line comparison, i.e., does "stored physimetric property" equal "captured physimetric property"? In the case of a color or light reflective/refractive index comparison, the algorithm can analyze "does color of the stored physimetric property equal to color of captured physimetric property"? In the case of a weight comparison, the algorithm can analyze "does weight of the stored physimetric property equal to weight of the captured physimetric property"? In all comparison methods, the two physimetric property data should be described the same way, for example if one physimetric property is described in numbers, the other physimetric property should be described in numbers; if one physimetric property is described in grams, the other physimetric property should be described in grams; if one physimetric property is described in letters, the other physimetric property should be described in letters.

The controlling device should also contain comparison algorithms to analyze the stored physimetric property and captured physimetric property, and deliver results of the comparison to the controlling device. The comparison algorithms can contain conditional statements, such as IF-THEN clauses, switch statements, statements with guards, and IF-THEN-ELSE statements, etc. For example,

```
IF captured physimetric property
    equal stored physimetric property
THEN
    "YES"
or,
IF captured physimetric property
    not equal stored physimetric
property
THEN
    "NO"
```

The algorithms may contain code to allow for a percentage deviation between captured physimeteric and stored physimetric property, such as 0.5% to 1.5% deviation. The inclusion of the percentage deviation will allow a "Yes" result even if the captured physimetric property is not totally equal to stored physimetric property. Such percentage deviation will allow the comparison application to discount errors that may result from temperature, humidity, improper calibration, operator error, etc.

The result from the comparison algorithm will be delivered to the operator (211), such as by audible signal, visual signal, or a combination thereof. Delivery may be made to computer screens, audio speakers, light display, etc. If the result is "Yes", i.e., according to the analysis algorithm, the captured physimetric property is equal to the stored physimetric property, the physical object will be passed forward through the read zone (213). If the result is "No", i.e., according to the analysis algorithm, the captured physimetric property is not equal to the stored physimetric property, the controlling device will stop automation and the physical object will be detained in the read zone (215).

If the physical object is detained in the read zone (215), the operator will begin re-checking operations on the physical object and the capturing device, for example rotating the physical object within the read zone to obtain a more accurate physimetric property reading, removal of substances that may affect the capturing device such as dust or dirt etc., or inspecting the physical object himself. The operator may then direct the controlling device to perform the procedure again starting from the information retrieval and physimetric property capture again (217). If the comparison yields a "Yes" result, the controlling device may be automated again and the physical object passed through the read zone. If the comparison yields a "No" result, the physical object may be removed from the read zone for further analysis.

FIG. 3 is an example of an embodiment of the instant method, wherein a pallet of goods (301) containing an ID Container (303) with a memory housing a code composed of a Unique ID specific to the goods and a code representing the recorded weight of the pallet (stored physimetric property) enters a read zone (307) along an automated conveyor belt (305). Upon entering the read zone (307), a interrogator (309) communicates with the ID Container to retrieve the code, while a scale (311) on the bottom of the read zone (307) determines the weight of the pallet (301) (captured physimetric property). The determined weight of the pallet is delivered to the comparison algorithm on the controlling device. The retrieved code is passed to the controlling device (313) where it is processed to provide the Unique ID and coded recorded weight of the pallet. The coded recorded weight is interpreted and then sent to the comparison algorithm on the controlling device, where it is compared to the determined weight. Based on the result of the comparison, i.e., does the stored weight equal the determined weight within the specified percentage deviation, the pallet (301) is either further passed through the read zone, i.e., the answer is "Yes", or the pallet is stopped, i.e., the answer is "No". If the pallet is stopped, the operator will inspect the read zone, and then begin the reader again. If a "No" answer results again, the pallet will be subject to further inspection by the operator.

EXAMPLE

In another example of the present method, a shopping cart full of different products, such as packaged food products, is pushed by a customer into a read zone of a checkout. All the items have attached ID Containers, such ID Containers possessing a Unique ID and coded physimetric property pertaining to a specific product. As each product is different, the information on each ID Container is different. The read zone contains an interrogator and a scale as a capturing device. Upon the interrogator scanning and reading the ID Container and passing the information to connected controlling device, the controlling device separates the Unique ID from the coded physimetric property, and converts the coded physimetric property into an intelligible physimetric property, in this case weight of the product. The controlling device then calculates the total weight of the products. The scale then determines the weight of the cart plus product, and passes this information to the controlling device. The controlling device weighs the cart, and determines the total weight of the products in the cart. The controlling device then compares the weight of the weighed products against the calculated weight obtained from scanning. If they are equal, plus or minus 1 to 3%, the products in the cart are verified. Following verification, the controlling device may calculate the total price of the products by accessing a database stored therein and associating a unit price with product.

In the event the weight of the weighed products does not equal the calculated weight of the scanned products, scanning and weighing are performed again. If they are still not equal, the controlling device stops automation and signals a store employee for assistance.

Having described embodiments of the present system with reference to the accompanying drawings, it is to be understood that the present system is not limited to the precise embodiments, and that various changes and modifications may be effected therein by one having ordinary skill in the art without departing from the scope or spirit as defined in the appended claims.

In interpreting the appended claims, it should be understood that:

a) the word "comprising" does not exclude the presence of other elements or acts than those listed in the given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be compromised of hardware portions (e.g., including discrete and integrated electronic circuitry), software portions (e.g., computer programming), and any combination thereof;

f) hardware portions may be comprised of one or both of analog an digital portions;

g) any of the disclosed devices or portions thereof may be combined together or separated into further portions unless specifically stated otherwise; and h) no specific sequence of acts or steps is intended to be required unless specifically indicated.

The invention claimed is:

1. A method for authenticating a physical object in a process control operation, the method comprising;
 directing the physical object into a read zone;
 retrieving information stored on a memory of an RFID tag attached to said physical object;
 capturing a physimetric property of said physical object;
 separating said retrieved information to obtain a stored Unique ID and a stored coded physimetric property, the coded physimetric property is encoded with a Secured Hash Algorithm;
 decoding said stored coded physimetric property to obtain a decoded physimetric property;
 comparing captured physimetric property to said decoded physimetric property;
 sending the results of said comparison to a controlling device;
 if said captured physimetric property is equal, within a percentage deviation, to said decoded physimetric property, then
 passing said physical object through said read zone.

2. The method of claim 1, wherein directing a physical object into said read zone occurs via conveyor belt.

3. The method of claim 1, wherein directing a physical object into said read zone occurs manually.

4. The method of claim 1, wherein retrieving said information occurs by scanning with an interrogator.

5. The method of claim 1, wherein capturing said physimetric property occurs by weighing, measuring, scanning, or viewing said physical object.

6. The method of claim 1, wherein decoding occurs by inputting said coded physimetric property into a conversion algorithm.

7. The method of claim 1, wherein said captured physimetric property and said decoded physimetric property are compared using comparison algorithms.

8. The method of claim 1, wherein results of said comparison are sent to said controlling device by wired or wireless communication.

9. The method of claim 1, wherein said captured physimetric property is equal to said decoded physimetric property if they are within a percentage deviation of from 0% to 1.5% of each other.

10. The method of claim 9, wherein said percentage deviation is from 0 to 0.5%.

11. The method of claim 1, wherein capturing said physimetric property occurs 2 or more times.

12. The method of claim 11, wherein capturing said physimetric property occurs 3 times.

13. A method for authenticating a physical object in a process control operation, the method comprising;
 directing the physical object into a read zone;
 retrieving information stored on a memory of an RFID tag attached to said physical object;
 capturing a physimetric property of said physical object;
 separating said retrieved information to obtain a stored Unique ID and a stored coded physimetric property, the coded physimetric property is encoded with a Secured Hash Algorithm;
 decoding said stored coded physimetric property to obtain an decoded physimetric property;
 comparing said captured physimetric property to said decoded physimetric property;
 sending the results of said comparison to a controlling device;
 if said captured physimetric property is not equal, within a percentage deviation, to said interpreted physimetric property, then performing steps a-c:
  a) stopping automation of said process control operation;
  b) reinitiating authentication by re-retrieving information from said ID Container;
  c) comparing the stored coded physimetric property obtained from said re-retrieved information to re-captured physimetric property; and
 communicating results from said comparison to said controlling device.

14. The method of claim 13, further comprising removing said physical object from said read zone.

15. The method of claim 13, where said captured physimetric property is not equal to said decoded physimetric property if they deviate from each other by more than 1.5%.

16. The method of claim 13, further comprising manipulating said physical object within said read zone if said re-retrieved information does not equal to said re-captured physimetric property.

17. The method of claim 16, wherein manipulation occurs by rotating said physical object.

* * * * *